(12) United States Patent
Kataoka et al.

(10) Patent No.: US 9,026,831 B2
(45) Date of Patent: May 5, 2015

(54) SYNCHRONOUS CONTROL SYSTEM INCLUDING A MASTER DEVICE AND A SLAVE DEVICE, AND SYNCHRONOUS CONTROL METHOD FOR CONTROLLING THE SAME

(75) Inventors: Teruo Kataoka, Kobe (JP); Masaya Sakamoto, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 636 days.

(21) Appl. No.: 13/386,267

(22) PCT Filed: Jul. 22, 2009

(86) PCT No.: PCT/JP2009/003442
§ 371 (c)(1),
(2), (4) Date: Mar. 2, 2012

(87) PCT Pub. No.: WO2011/010345
PCT Pub. Date: Jan. 27, 2011

(65) Prior Publication Data
US 2012/0159026 A1    Jun. 21, 2012

(51) Int. Cl.
*H04N 21/242* (2011.01)
*H04L 12/26* (2006.01)
*H04N 21/43* (2011.01)

(52) U.S. Cl.
CPC .......... *H04N 21/242* (2013.01); *H04L 43/0864* (2013.01); *H04N 21/4305* (2013.01)

(58) Field of Classification Search
CPC .................................................. H04L 43/0864
USPC ......................................................... 713/375
See application file for complete search history.

(56) References Cited

U.S. PATENT DOCUMENTS

2004/0153709 A1 * 8/2004 Burton-Krahn .................. 714/4
2007/0189399 A1 * 8/2007 Christison et al. ....... 375/240.28

(Continued)

FOREIGN PATENT DOCUMENTS

JP    H01-231618 A    4/1991
JP    2003-179584 A    6/2003

(Continued)

OTHER PUBLICATIONS

English Translation of Unexamined Japanese Patent Application Publication No. H07-015421 dated Jan. 17, 1995.

(Continued)

*Primary Examiner* — Jaweed A Abbaszadeh
*Assistant Examiner* — Alyaa T Mazyad
(74) *Attorney, Agent, or Firm* — Arent Fox LLP

(57) ABSTRACT

The present invention relates to a method of synchronous control for a synchronous control system provided with a master device and at least one slave device connected via a communications network. The master device transmits first time data to the master device and the at least one slave device upon detection of generation of a synchronization signal, the first time data indicating a time at which the synchronization signal is generated. The master device transmits second time data to the at least one slave device upon reception of the first time data, the second time data indicating a time at which the first time data is received. Each of the at least one slave device calculates, upon reception of the first time data and the second time data, an estimated generation time at which the synchronization signal is estimated to be generated by subtracting time elapsed between the time indicated by the first time data and the time indicated by the second time data from time at which the first time data was received. Each of the at least one slave device controls synchronization with the master device based on the estimated generation time.

7 Claims, 7 Drawing Sheets

(56) References Cited

U.S. PATENT DOCUMENTS

2008/0031283 A1* 2/2008 Curran-Gray et al. ........ 370/503
2011/0158364 A1* 6/2011 Fullam .......................... 375/362

FOREIGN PATENT DOCUMENTS

| JP | 2004-304809 A | 10/2004 |
| JP | 2008-178086 A | 7/2008 |
| JP | 2009-111654 A | 5/2009 |
| JP | 4981073 B2 | 7/2012 |
| WO | 2007104891 A2 | 9/2007 |
| WO | 2011010345 | 1/2011 |

OTHER PUBLICATIONS

English Translation of PCT Publication No. PCT/JP2009/530885, dated Aug. 27, 2009.

English Translation of Notice of Reasons for Rejection dated Oct. 10, 2013 regarding Japan Application No. JP2012-503141.

International Preliminary Report on Patentability dated Jan. 24, 2012 and Written Opinion regarding PCT Application No. PCT/JP2009/003442.

Garner, G.M. "Description of Use of IEEE 1588 Peer-To-Peer Transparent Clock in A/V Bridging Networks (Revision 2.0)" retrieved from the internet: URL:http://www.ieee802.org/1/files/public/docs2006/as-garner-use-of-p2p-tc-in-avb-v2p0-060512.pdf, Jul. 24, 2006, pp. 7-13 (XP007900886).

Teener, Michael D. Johas, et al. "Overview and timing performance of IEEE 802.1AS" Precision Clock Synchronization for Measurement, Control and Communication, 2008. ISPCS 2008. IEEE International Symposium on, IEEE, Piscataway, NJ., Sep. 22, 2008, pp. 49-53 (XP031354122).

International Search Report for International Application No. PCT/JP2009/003442, mailed Feb. 15, 2010, 4 pages.

* cited by examiner

SYNCHRONOUS CONTROL SYSTEM INCLUDING A MASTER DEVICE AND A SLAVE DEVICE, AND SYNCHRONOUS CONTROL METHOD FOR CONTROLLING THE SAME

CROSS-REFERENCE TO RELATED APPLICATION

This application is a United States National Stage Application under 35 U.S.C. §371 of International Patent Application No. PCT/JP2009/003442, filed Jul. 22, 2009, which is incorporated by reference into this application as if fully set forth herein.

TECHNICAL FIELD

The present invention relates to a synchronous control system including a master device and a slave device connected with each other via a communications network, and a synchronous control method for controlling the same.

BACKGROUND ART

Conventionally, playback of music or video images by controlling synchronization of a plurality of playback apparatuses, which are connected with each other via communications network such as Ethernet (registered trademark) and which process and play audio data and/or video data has been conducted.

When video frames are synchronized among playback apparatuses which are connected with each other via a communications network, a high degree of accuracy is required. Therefore, a hardware technique is employed such that a reference synchronization signal, generated using an external synchronization signal generator such as a Genlock (Generator Lock) circuit, is inputted into the plurality of playback apparatuses, and then synchronized (see Patent Literature 1).

In order to eliminate the need for an external circuit such as a synchronization signal generator, there is a technique in which a transmitter and receivers that are connected via a communications network cyclically generate a reference synchronization signal and secondary synchronization signals, respectively, thereby establishing frequency synchronization between a reference clock of the transmitter which serves as a basis for synchronization and local clocks of the receivers which are to be synchronized. The transmitter transmits a video timing packet to the receivers based on the reference clock. The video timing packet includes information relating to a difference in timing between a time at which the video timing packet has been transmitted to the communications network and a time at which the reference synchronization signal has been generated. Each receiver controls a timing at which the secondary synchronization signal is generated, based on the information included in the video timing packet relating to the difference in timing between the time at which the video timing packet has been transmitted to the communications network and the time at which the reference synchronization signal has been generated, as well as based on a time at which the timing packet has arrived (see Patent Literature 2).

Furthermore, in accordance with the spread of network-connected home appliances, technology for controlling synchronization of various home electric appliances that are connected via a communications network as well as of playback apparatuses for audio data and/or video data, at low cost, is also desired.

CITATION LIST

Patent Literature

PTL 1: WO2007/104891
PTL 2: Japanese Unexamined Patent Application 2004-304809

SUMMARY OF INVENTION

Technical Problem

For the method disclosed in Patent Literature 1, a hardware component for establishing synchronization between video frames, such as a Genlock circuit and a synchronization signal generator, is essential. However, such a hardware component for establishing synchronization between video frames is usually expensive. Furthermore, it is necessary to input a reference synchronization signal to the plurality of playback apparatuses with which synchronization is to be carried out, and thus wiring of signal lines from the synchronization signal generator is required.

The receivers used for the method of synchronization disclosed in Patent Literature 2 become synchronous with the transmitter based on the information included in the video timing packet, relating to the difference in timing between the time at which the video timing packet is transmitted to the communications network and the time at which the respective reference synchronization signals are generated, as well as based on the time at which the timing packet arrives. Accordingly, it is possible to control the synchronization between the receivers based on a signal transmitted from the transmitter. However, it is not possible to estimate a time period required for the packet to arrive at the receivers from the transmitter based on the information contained in the video timing packet, and therefore, the receivers cannot correctly estimate processing time by the transmitter. Thus, another drawback is encountered in that the receivers cannot be synchronized with the transmitter.

It is, therefore, an object of the present invention to provide a synchronous control system including a master device and a slave device connected with each other via a communications network, which can control the synchronization between the master device and the slave device connected via the network without any additional hardware, and a synchronous control method for controlling the same.

Solution to Problem

In accordance with a first aspect of the present invention, there is provided a method of synchronous control for a synchronous control system provided with a master device and at least one slave device connected via a communications network, the method comprising steps of: the master device transmitting first time data to the master device and the at least one slave device upon detection of generation of a synchronization signal, the first time data indicating a time at which the synchronization signal is generated; the master device transmitting second time data to the at least one slave device upon reception of the first time data, the second time data indicating a time at which the first time data is received; each of the at least one slave device calculating, upon reception of the first time data and the second time data, an estimated generation time at which the synchronization signal is estimated to be generated by subtracting a time elapsed between the time indicated by the first time data and the time indicated by the second time data from time at which the first time data was received; and each of the at least one slave device controlling synchronization with the master device based on the estimated generation time.

In accordance with another aspect of the present invention, there is provided a synchronous control system, comprising: a master device including a transmitter receiver unit that transmits and receives data via a communications network, a synchronous signal detecting unit that detects generation of a synchronous signal, a timer unit that keeps time, and a control unit; and at least one slave device including a receiver unit that receives data from the master device via the communications network, a timer unit that keeps time, and a control unit. When the synchronous signal detecting unit of the master device detects generation of a synchronization signal, the control unit of the master device obtains a time at which the synchronization signal is generated from the timer unit of the master device, transmits first time data indicating a time at which the synchronization signal is generated to the master device and the at least one slave device via the communications network by way of the transmitter receiver unit, and when the transmitter receiver unit receives the first time data via the communications network, further obtains a time at which the first time data is received from the timer unit of the master device, and transmits second time data to the at least one slave device, the second time data indicating a time at which the first time data is received. When the receiver unit of each of the at least one slave device receives the first time data and the second time data from the master device via the communications network, the control unit of each of the at least one slave device calculates an estimated generation time at which the synchronization signal is estimated to be generated by subtracting a time elapsed between the time indicated by the first time data and the time indicated by the second time data from time at which the first time data was received, and controls synchronization with the master device based on the estimated generation time.

DESCRIPTION OF EMBODIMENTS

Hereinafter, specific embodiments of the present invention will be explained with reference to accompanying drawings.

First Embodiment

Figure 1:
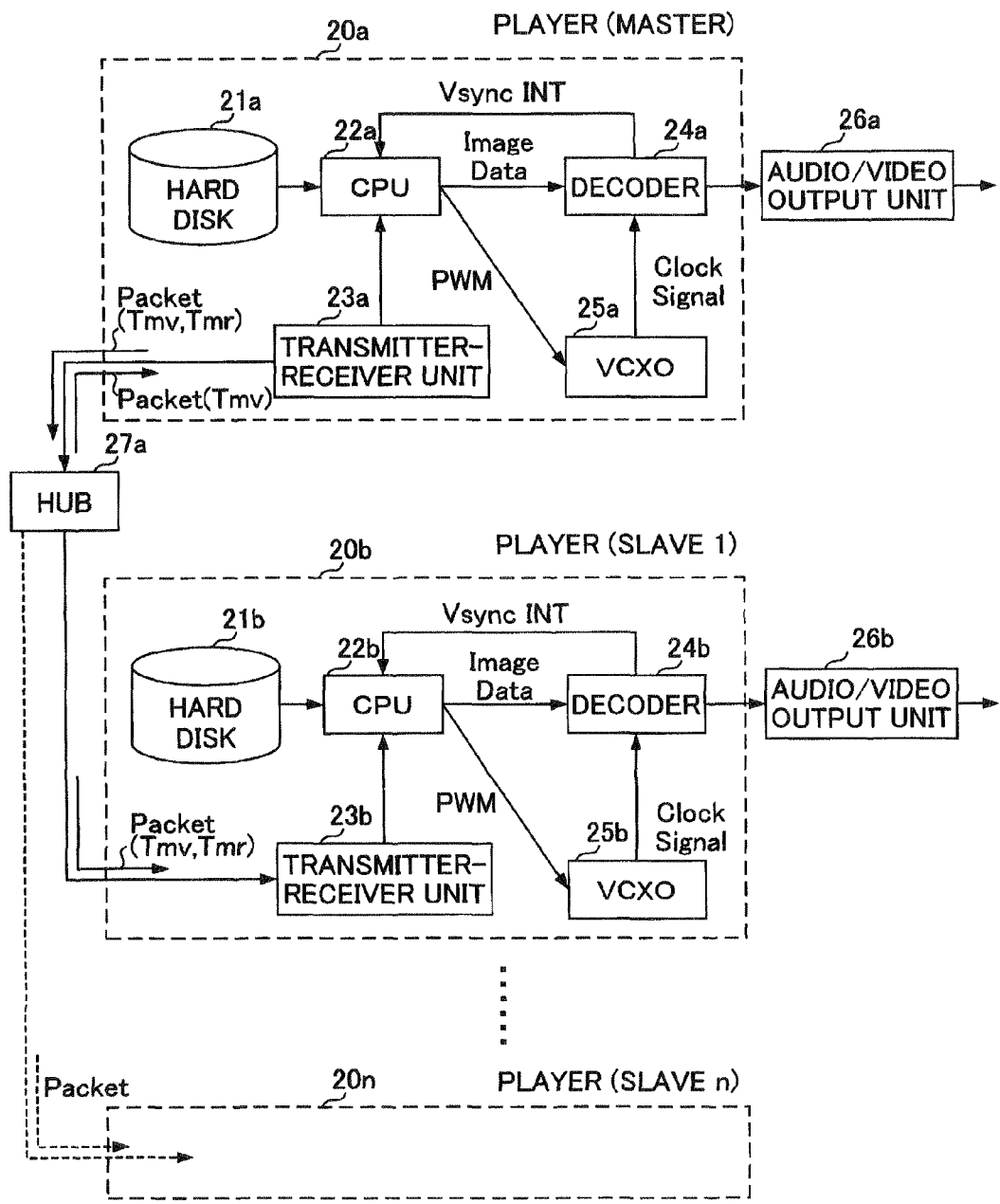
FIG. 1 is a block diagram showing a synchronous control system according to a first embodiment of the present invention.

FIG. 1 is a block diagram showing a synchronous control system 10 according to a first embodiment of the present invention provided with a master player 20a as a master device and slave players 20b to 20n as one or more slave devices, and the master device and the slave devices mutually transmit and receive data via a communications network. Each of the master player 20a and the slave players 20b to 20n is constituted as an audio/video playback apparatus that decodes compressed data to audio/video data and outputs the audio/video data from audio/video output units 26a and 26b.

Referring to FIG. 1, the synchronous control system 10 includes the master player 20a, the one or more slave players 20b to 20n, and a hub 27a that connects the master player 20a and the one or more slave players 20b to 20n. The master player 20a and the slave players 20b to 20n are synchronously controlled based on a time packet transmitted from the master player 20a. This communications network is, for example, an Ethernet (registered trademark) network, in which the master player 20a and the one or more slave players 20b to 20n are connected via the hub 27a. In the present embodiment, operations of the slave players 20b to 20n are synchronously controlled in accordance with an event that occurs or a synchronization signal that is generated, when the master player 20a executes decoding processing.

The master player 20a is provided with a hard disk 21a, a Central Processing Unit (CPU) 22a that constitutes a control unit in the present embodiment, a transmitter-receiver unit 23a that transmits and receives data to and from the one or more slave players 20b to 20n via the communications network, a decoder 24a that decodes compressed data stored in the hard disk 21a to generate video data and/or audio data, and a Voltage-Controlled Crystal Oscillator (VCXO) 25a that provides timing information for the CPU 22a to operate.

The hard disk 21a functions as storage, and stores contents such as video data and audio data that are compressed in MPEG format or the like. The transmitter-receiver unit 23a transmits and receives data to and from the slave players 20b to 20n connected to the master player 20a via the hub 27a. The decoder 24a decodes the compressed data stored in the hard disk. The video data and/or audio data decoded by the decoder 24a is outputted to a display device or the like that is not shown in the drawing through the audio/video output unit 26a. In the present embodiment, a storage device that stores the compressed data is described as the hard disk 21a. However, the present invention is not limited to such an example, and various storage devices such as Digital Versatile Disc Random Access Memory (DVD-RAM) can be employed depending on actual implementation, as long as they are suitable for storing the compressed data.

The VCXO 25a generates a clock signal. The decoder 24a operates in accordance with the clock signal, i.e. a timing signal, generated by the VCXO 25a. Furthermore, the CPU 22a controls a voltage supplied to the VCXO 25a by Pulse-Width-Modulation (PMW) control, thereby controlling the timing at which the VCXO 25a generates the clock signal.

The CPU 22a controls the decoder 24a so that the compressed data stored in the hard disk 21a is decoded in accordance with the clock signal generated by the VCXO 25a. In addition, the CPU 22a obtains generation timing of a video vertical synchronization (Vsync) signal that is generated when the decoder 24a decodes the video data according to a Vsync interrupt (Vsync INT) signal. Moreover, the CPU 22a keeps time according to the clock signal generated by the VCXO 25a. In the present invention, the CPU 22a serves as a synchronization signal detecting unit, and the VCXO 25a serves as a timer unit.

The communications network including the hub 27a is configured such that, when the master player 20a transmits a packet by multicast transmission, a multicast address of the packet is identified, the packet is delivered substantially at the same time to all devices that are connected to the hub 27a via the communications network, and the master player 20a and all of the slave players 20b to 20n within the communications network can receive the packet substantially at the same time. The hub 27a can be a switching hub or the like capable of identifying the multicast address and carrying out the multicast transmission, for example. The synchronous control system constituted by the master player 20a and the slave players 20b to 20n is designed as a closed system connected by the single hub 27a so as to make a delay in transmission of the packet negligibly small. Furthermore, while the number of the master player 20a included in a single synchronous control system is just one, the number of the slave players 20b to 20n included in a single synchronous control system can be more than one.

Since each of the slave players 20b to 20n has the same hardware configuration as that of the master player 20a, the components of the slave players 20b to 20n are represented by like numerals and not described in detail.

Upon reception of a first time packet and a second time packet transmitted from the master player 20a, a CPU 22b of the slave player 20b calculates a time by subtracting a time elapsed between a time indicated by the first time packet and a time indicated by the second time packet from a time at which the first time packet is received, and controls synchronization with the master player 20a using the calculated time as the generation timing of the video vertical synchronization (Vsync) signal of the master player 20a.

The players 20a to 20n have the same hardware configuration relating to synchronous control. Therefore, according to the configuration of the present embodiment, one of the players 20a to 20n can serve as the master device and the remaining players can serve as the slave devices as needed.

Next, synchronous control processing executed by the synchronous control system 10 thus configured, in which an operation of each of the one or more slave players 20b to 20n is synchronized with the timing at which the master player 20a processes video data, is described. The processing that synchronizes the operation of each of the plurality of slave players 20b to 20n with the timing at which the master player 20a processes the video data is the same as that of synchronizing an operation of the single slave player 20b with the timing at which the master player 20a processes the video data. Therefore, the following describes processing flow of synchronously controlling the master player 20a and the slave player 20b as one example.

Figure 2:
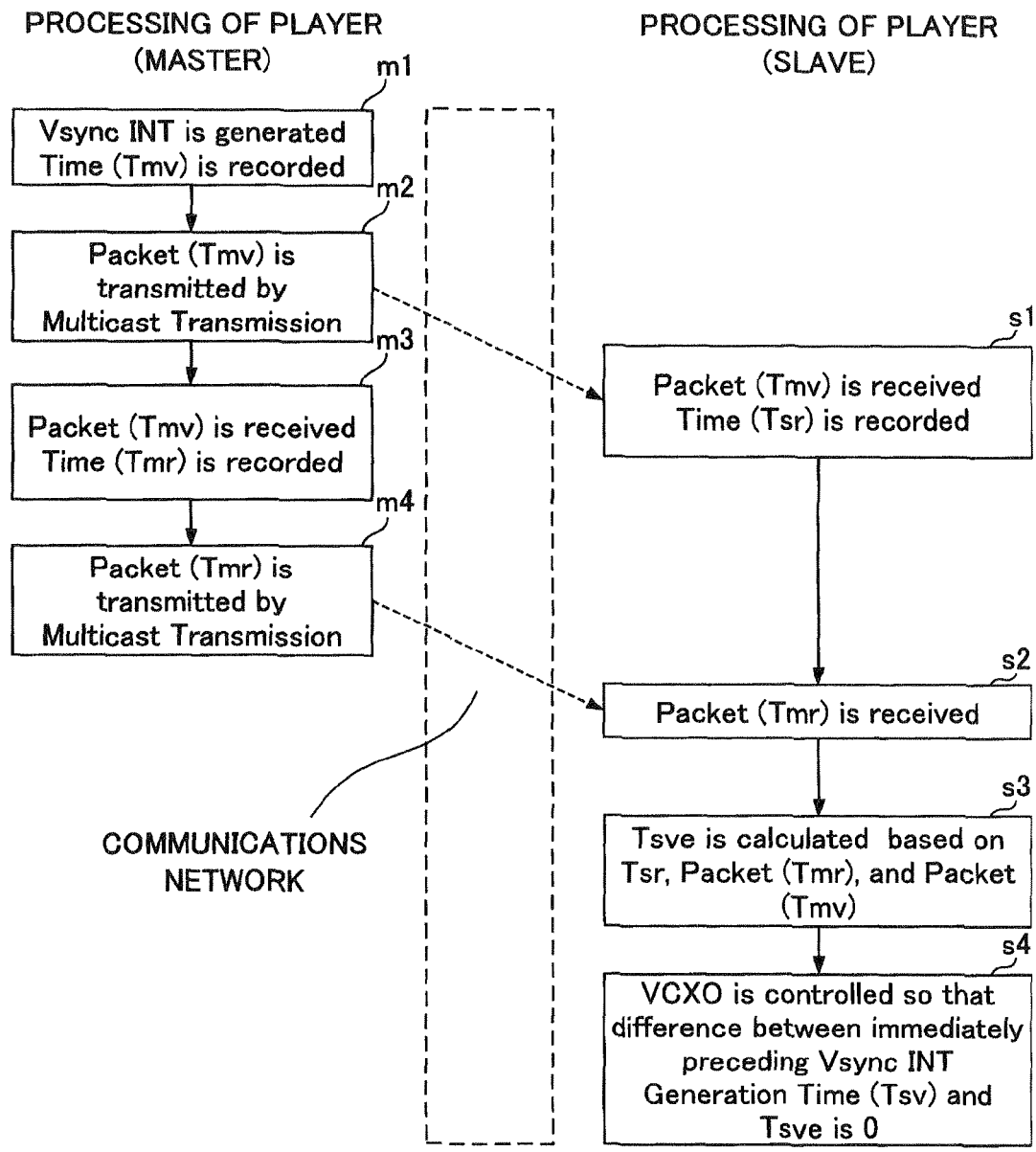
FIG. 2 is a diagram illustrating a flow of processing carried out by a master device and a slave device constituting the synchronous control system shown in FIG. 1.
Figure 3:
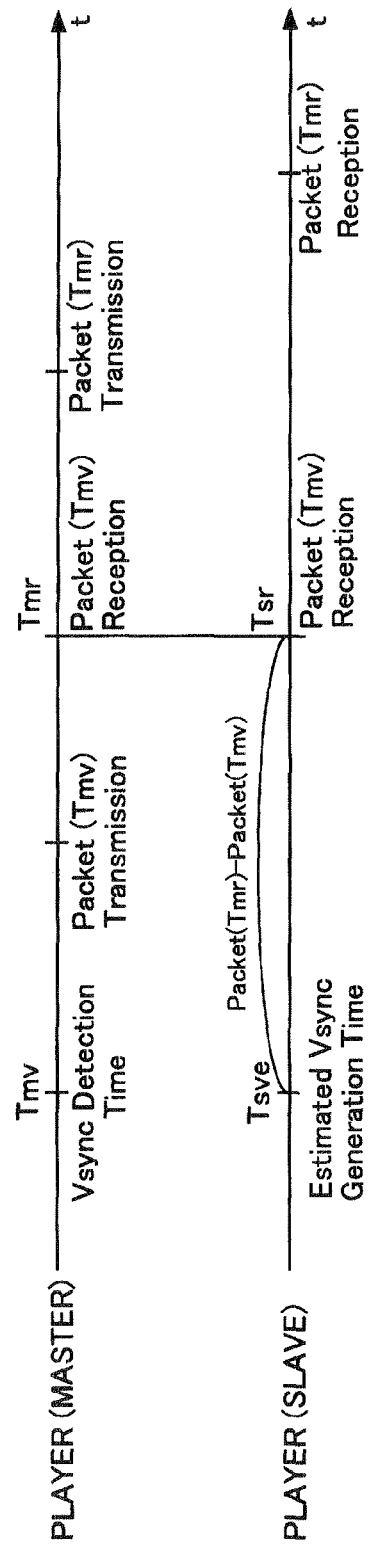
FIG. 3 is a diagram illustrating the processing shown in FIG. 2 in a chronological order.

FIG. 2 is a diagram illustrating the processing flow carried out by the master player 20a and the slave player 20b for establishing synchronous control, and FIG. 3 is a diagram illustrating processing respectively executed by the master player 20a and the slave player 20b in a chronological order.

First, the processing executed by the master player 20a is described referring to Steps m1 to m4 in FIG. 2 as well as the chronological order shown in FIG. 3.

At first, upon detection of the generation of the Vsync signal based on an input of the Vsync INT signal from the decoder 24a, the CPU 22a of the master player 20a records a time Tmv at which the Vsync INT signal is detected (Step m1). The time Tmv that represents the Vsync signal generation timing is required to be recorded with a high degree of accuracy. Therefore, the recording of the time at which the Vsync INT signal is detected is carried out by an interrupt handler, or the processing that records the time at which the Vsync INT signal is detected is carried out with higher priority than other processing.

Next, a packet (Packet (Tmv)) that contains information of a value of the time Tmv is transmitted by multicast transmission (Step m2). The packet is transmitted to all the players that are connected to the hub 27a at the same time, including the master player 20a itself. The packet (Packet (Tmv)) corresponds to first time data according to the present invention.

Then, the master player 20a receives the packet (Packet (Tmv)) that the master player 20a itself transmitted, and records a time Tmr at which the packet (Packet (Tmv)) is received (Step m3). Similarly to the recording of the time Tmv in Step m1, the time Tmr is required to be recorded with a high degree of accuracy. Therefore, the recording of the time Tmr at which the packet (Packet (Tmv)) is received is carried out by an interrupt handler, or the processing that records the time Tmr at which the packet (Packet (Tmv)) is received is carried out with higher priority than other processing.

Then, in order to make the time Tmv reproducible on the slave player 20b, a packet (Packet (Tmr)) that contains information of a value of the time Tmr is transmitted to the slave player 20b (Step m4). As long as the slave player 20b can receive the packet (Packet (Tmr)) containing the value of the time Tmr, it is not necessary to transmit the packet (Packet (Tmr)) by multicast transmission. The packet (Packet (Tmr)) corresponds to second time data according to the present invention.

Next, the following describes the processing executed by the slave player 20b with reference to Steps s1 to s4 in FIG. 2, as well as the chronological order shown in FIG. 3.

At first, the CPU 22b of the slave player 20b receives the packet (Packet (Tmv)) that has been transmitted by the master player 20a in Step m2, and records a time Tsr at which the packet (Packet (Tmv)) has been received (Step s1). In this step, similarly to the recording of the time Tmr in Step m3, the time Tsr is required to be recorded with a high degree of accuracy. Therefore, the recording of the time Tsr at which the packet (Packet (Tmv)) has been received is carried out by an interrupt handler, or the processing that records the time at which the packet (Packet (Tmv)) is received is executed with higher priority than other processing. Then, the packet (Packet (Tmr)) that has been transmitted by the master player 20a in Step m4 is received (Step s2).

Next, an estimated generation time Tsve at which the Vsync signal is estimated to be generated on the master player 20a is calculated (Step s3). The time Tsve is calculated based on the following expression.

$$Tsve = Tsr - (Tmr - Tmv)$$

In this manner, the time at which the Vsync signal has been generated on the side of the master player 20a becomes reproducible on the side of the slave player 20b.

The slave player 20b separately records the time (Tsv) every time the Vsync signal is generated, and controls a video display clock by adjusting a VCXO 25b so that a difference between the time Tsv and the time Tsve is zero, that is, so that the time Tsv corresponds with the time Tsve (Step s4).

Here, the synchronization signal generation times that are required to be recorded with a high degree of accuracy are the times (Tmv and Tsv) at which the Vsync INT signal is detected and the timings (Tmr and Tsr) at which the Packet (Tmv) is received. Therefore, it is possible to make a delay time in the processing substantially zero, by obtaining and recording these times and timings by interrupt handlers, or by executing the processing that obtains and records these times and timings with higher priority than other processing. As a result, it is possible to reduce the delay time except for the transmission delay, and to improve accuracy in synchronization between the master player 20a and the slave player 20b.

For a CPU whose clock frequency is 100 MHz, for example, the delay is approximately 200 nsec, provided that it takes 20 clock cycles before processing by an interrupt handler can be executed after detection of an interruption. As a result of this delay, the processing can be executed within an error of +−1 frame even if playback time per frame is approximately 30 msec. Therefore, it is possible to establish synchronous control with sufficient accuracy for playing video.

Furthermore, the time at which the Packet (Tmv) is received is required to be substantially the same time for all of the players 20a to 20n. In this regard, using the communications network including the hub 27a as described above, the master player 20a can transmit the packet substantially at the same time to all of the players 20a to 20n including the master player 20a itself. With this, the reception time Tmr at which the Packet (Tmv) is received by the master player 20a and the reception time Tsr at which the Packet (Tmv) is received by the slave player 20b can be substantially the same.

In the present embodiment, an example in which the players 20a to 20n are connected using the hub 27a capable of carrying out multicast transmission in the communications network has been described. However, the present invention is not limited to such an example. As long as the multicast transmission between the players 20a to 20n can be carried out, and as long as the transmission delays between the master player and the hub 27a and between the hub 27a and the slave players can be made equal, the communications network is not limited to a wired network and can be a wireless network that is formed using wireless LAN such as IEEE 802.11 or Bluetooth (registered trademark), for example. In this case, the hub 27a is a wireless LAN access point or a Bluetooth hub.

As described above, in the synchronous control system 10 according to the present embodiment, the estimated generation time Tsve of the synchronization signal on the slave player 20b can be substantially the same as the time Tmv at which the Vsync signal is generated on the master player 20a. Therefore, by adjusting the timing at which the Vsync signal is generated on the slave players 20b to 20n to the time Tsve, video display timing of the slave players 20b to 20n can be synchronized with video display timing of the master player 20a. In addition, other than the processing at the specific timings as described above, that is, at the Vsync INT signal generation timings (Tmv and Tsv) and at the timings (Tmr and Tsr) at which the Packet (Tmv) is received, timings to execute processing do not have to be given special consideration, and thus, real-time processing is not necessary. Accordingly, it is possible to synchronously control the players 20a to 20n without placing a load on the players 20a to 20n. Thus, the video frames can be synchronized between the master player 20a and the slave players 20b to 20n without using an external synchronization signal generator hardware such as a Genlock circuit. Moreover, the need for wiring of synchronization signal lines is eliminated by using an existing network.

Second Embodiment

In the first embodiment, the master player 20a transmits the time Tmr at which the packet (Packet (Tmv)) is received in Step m4. However, the present invention is not limited to this example. For example, if the transmission delay through the network via which the slave players 20b to 20n are connected to the master player 20a is known, the master player 20a can transmit information containing the transmission delay in addition to the reception time at which the packet (Packet (Tmv)) is received. Depending on conditions of a network route between the master player 20a and the hub 27a, and of network routes between the hub 27a and the slave players 20b to 20n, the time at which the master player 20a receives the packet (Packet (Tmv)) via the hub 27a often differs to a large degree from the time at which any of the slave players 20b to 20n receives the packet (Packet (Tmv)) via the hub 27a. If a difference between the time required for the master player 20a to receive the packet via the hub 27a and the time required for each of the slave players 20b to 20n to receive the packet via the hub 27a is constant and known, each of the slave players 20b to 20n can calculate the timing considering the transmission delay of the respective slave players 20b to 20n, by taking into account the time at which the master player 20a has received the packet (Packet (Tmv)) via the hub 27a, together with the difference between the time at which the master player 20a has received the packet (Packet (Tmv)) via the hub 27a and the time at which any of the slave players 20b to 20n receives data of the time at which the synchronization signal has been generated via the hub 27a.

The present embodiment describes a method of calculating the transmission delay in a case in which the difference between the time required for the master player 20a to receive the packet via the hub 27a and the time required for each of the slave players 20b to 20n to receive the packet via the hub 27a is known.

In order to facilitate understanding, the configuration of the synchronous control system and the processing flow of synchronous control according to the second embodiment are assumed to be substantially the same as those of the synchronous control system 10 according to the first embodiment.

The synchronous control system according to the present embodiment is the same as the configuration of the synchronous control system 10 according to the first embodiment other than the chronological order of the processing, the information of the packet that the master device transmits to the slave device in Step m4 being transmission delay information, and the method of calculating the estimated generation time Tsve of the synchronization signal. Accordingly, similar reference symbols and step numbers as in the synchronous control system 10 according to the first embodiment are used in the following description.

Figure 4:
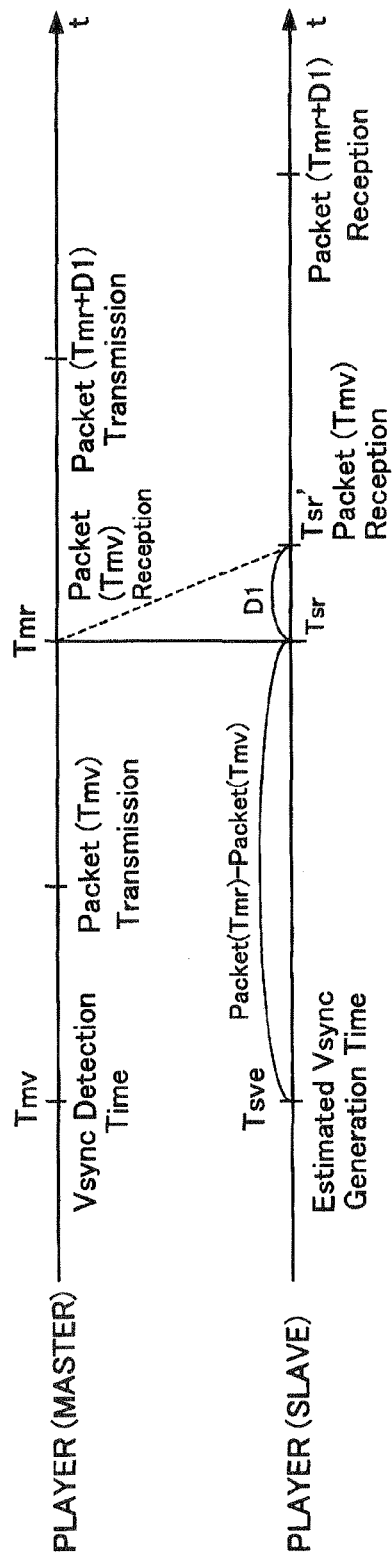
FIG. 4 is a diagram illustrating a chronological order of processing in a synchronous control system according to a second embodiment of the present invention.

FIG. 4 is a diagram illustrating processing carried out by each of the master player 20a and the slave player 20b according to the present embodiment in a chronological order. As shown in FIG. 4, in the present embodiment, the difference between the time required for the master player 20a to receive the packet via the hub 27a and the time required for each of the slave players 20b to 20n to receive the packet via the hub 27a is represented by D1. A value for D1 is known and is constant. Assuming that the time when the slave player 20b receives the Packet (Tmv) is Tsr', the time Tsr' deviates from the time Tmv at which the master player 20a has received the Packet (Tmv) by only D1. In other words, assuming that the time when the slave player 20b receives the Packet (Tmv) is Tsr in a case in which the time required for the master player 20a to receive the packet via the hub 27a and the time required for each of the slave players 20b to 20n to receive the packet via the hub 27a are equal, a relation between Tsr' and Tsr is represented by the following expression.

$$Tsr'=Tsr+D1$$

In the present embodiment, the packet that the master player 20a transmits to the slave player 20b in Step m4 includes, as the transmission delay information, the time derived by adding D1 to the time Tmr, i.e. (tmr+D1). Since Tmr=Tsr, the following relation is true.

$$Tmr+D1=Tsr+D1=Tsr'$$

Accordingly, Tsve is calculated based on the following expression.

$$Tsve = Tsr - (Tmr - Tmv) = (Tsr' - D1) - (Tmr - Tmv)$$

As described above, in the present embodiment, the master player 20a as the master device and the slave players 20b to 20n as the slave devices are synchronously controlled by considering the difference between the time required for the master player 20a to receive the packet via the hub 27a and the time required for each of the slave players 20b to 20n to receive the packet via the hub 27a. Therefore, even if time difference is generated between the times at which the packet is received from the hub 27a due to such reasons as different communication capacity between communication routes from the master player 20a to the hub 27a and from each of the slave players 20b to 20n to the hub 27a, for example, as long as the time difference is known and constant, it is still possible to carry out synchronous control using an inexpensive configuration, similarly to the above described embodiment.

Third Embodiment

In the above described embodiments, a case in which the present invention is applied to an audio/video playback apparatus is described. However, the present invention is not limited to such examples. The present invention can be applied not only to devices that play video images and/or sound, but also to various other devices as long as such devices are connected via a communications network in a manner such that multicast transmission is possible and the transmission delay between devices is equal. The present embodiment describes a case in which the present invention is applied to devices such as network-connected home appliances connected with one another via a communications network.

Figure 5:
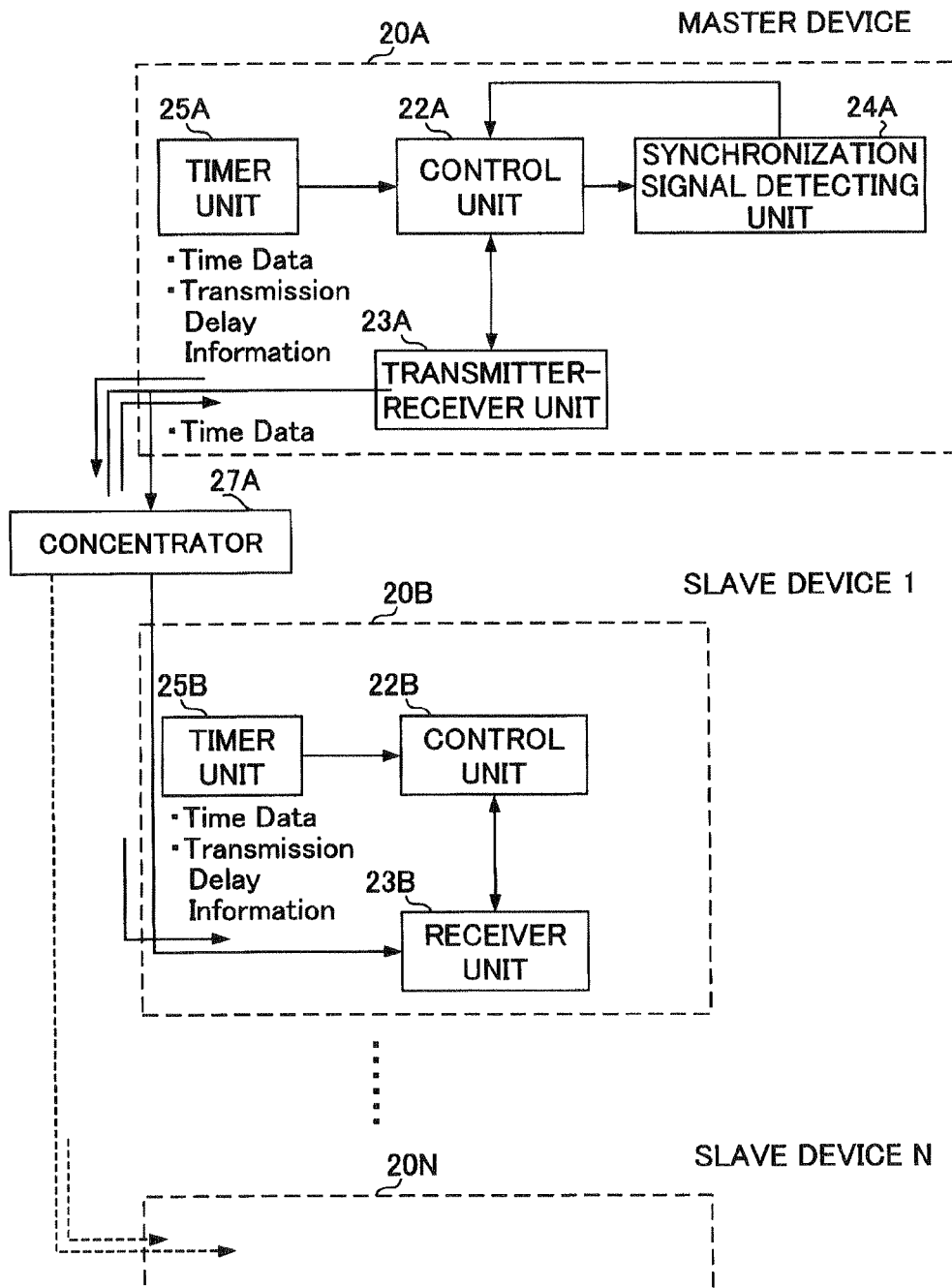
FIG. 5 is a block diagram showing a synchronous control system according to a third embodiment of the present invention.

FIG. 5 is a block diagram of a synchronous control system 20 according to a third embodiment of the present invention that includes a master device 20A and a slave device 20B capable of transmitting and receiving data with each other via a communications network. Referring to FIG. 5, the synchronous control system 20 is provided with a master device 20A, one or more slave devices 20B to 20N, and a concentrator 27A that connects the master device 20A and the slave devices 20B to 20N via the communications network. The synchronous control between the master device 20A and the slave devices 20B to 20N is carried out based on the operation of the master device 20A. The communications network, for example, can be an Ethernet (registered trademark) network, and the concentrator 27A can be, for example, a hub. In the present embodiment, operations carried out by the slave devices 20B to 20N are synchronously controlled according to a signal that is generated or an event that occurs, when the master device 20A carries out a predetermined operation.

The master device 20A is provided with a transmitter-receiver unit 23A that transmits and receives data to and from the one or more slave devices 20B to 20N via the communications network, a synchronization signal detecting unit 24A that detects a synchronization signal that is generated when the master device 20A carries out the predetermined operation, a timer unit 25A that keeps time, and a control unit 22A.

The control unit 22A is constituted by a CPU (Central Processing Unit) and the like, and controls the transmitter-receiver unit 23A, the synchronization signal detecting unit 24A, the timer unit 25A, etc., thereby realizing various functions of the master device 20A.

The transmitter-receiver unit 23A can be, can include, or can be a part of a network interface card, for example.

The synchronization signal detecting unit 24A detects the synchronization signal that is generated when the master device 20A carries out the predetermined operation. Examples of the synchronization signal detected by the synchronization signal detecting unit 24A include, for example, a frame synchronization signal such as a vertical synchronization signal, a field synchronization signal, and a time code. However, the present invention is not limited to these examples. Examples of operations that can be carried out by the master device 20A and the slave device 20B include various operations such as switching off an illuminating lamp and turning on and off an air conditioner, and control of video and audio devices. Therefore, the synchronization signal detected by the synchronization signal detecting unit 24A is not limited to the frame synchronization signal, the field synchronization signal, or the time code as long as it is suitable for the synchronous control of the operations carried out by the master device 20A and the slave device 20B, and different types of signals can be arbitrarily used as the synchronization signal.

Furthermore, the timer unit 25A is constituted by an internal clock of the master device 20A. Preferably, the concentrator 27A is a hub capable of identifying a multicast address and carrying out multicast transmission, for example.

The slave device 20B that is connected to the master device 20A is provided with a receiver unit 23B that receives data from the master device 20A via the communications network, a timer unit 25B that keeps time, and a control unit 22B. These components included in the slave device 20B are substantially the same as the corresponding components included in the master device 20A, and not described in detail.

In addition, in a case in which the master device 20A is connected with two or more slave devices 20B to 20N, each of the slave devices 20B to 20N also includes the same components as the slave device 20B as described above, and therefore these components are not described.

The synchronous control system 20 of the present embodiment is configured such that a synchronization signal generation time packet that is transmitted from the master device 20A is transmitted to the master device 20A and the one or more slave devices 20B to 20N at the same time by multicasting, and such that the synchronization signal generation time packet thus transmitted is received by the master device 20A and the one or more slave devices 20B to 20N at the same time. Accordingly, the synchronous control system 20 constituted by the master device 20A, the one or more slave devices 20B to 20N, and the concentrator 27A is designed as a closed system by the concentrator 27A.

Next, the processing of synchronous control carried out by the synchronous control system 20 thus configured for synchronizing the operations of the one or more slave devices 20B to 20N with the predetermined operation of the master device 20A is described. The processing that synchronizes the operation of each of the plurality of slave devices 20B to 20N with the predetermined operation of the master device 20A is the same as the processing that synchronizes the predetermined operation of the single slave device 20B with the predetermined operation of the master device 20A. Therefore, the following describes processing flow that is executed by the master device 20A and the slave device 20B for synchronous control.

Figure 6:
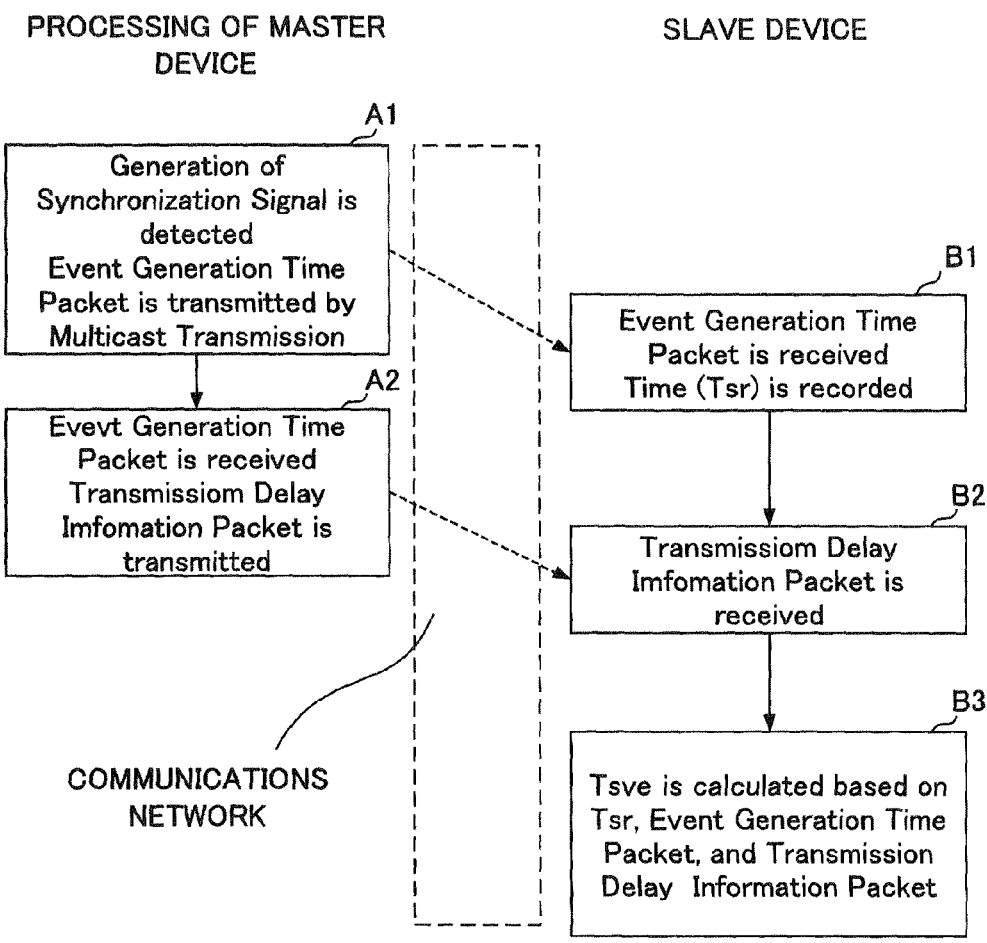
FIG. 6 is a diagram illustrating a flow of processing carried out by a master device and a slave device constituting the synchronous control system shown in FIG. 5.
Figure 7:
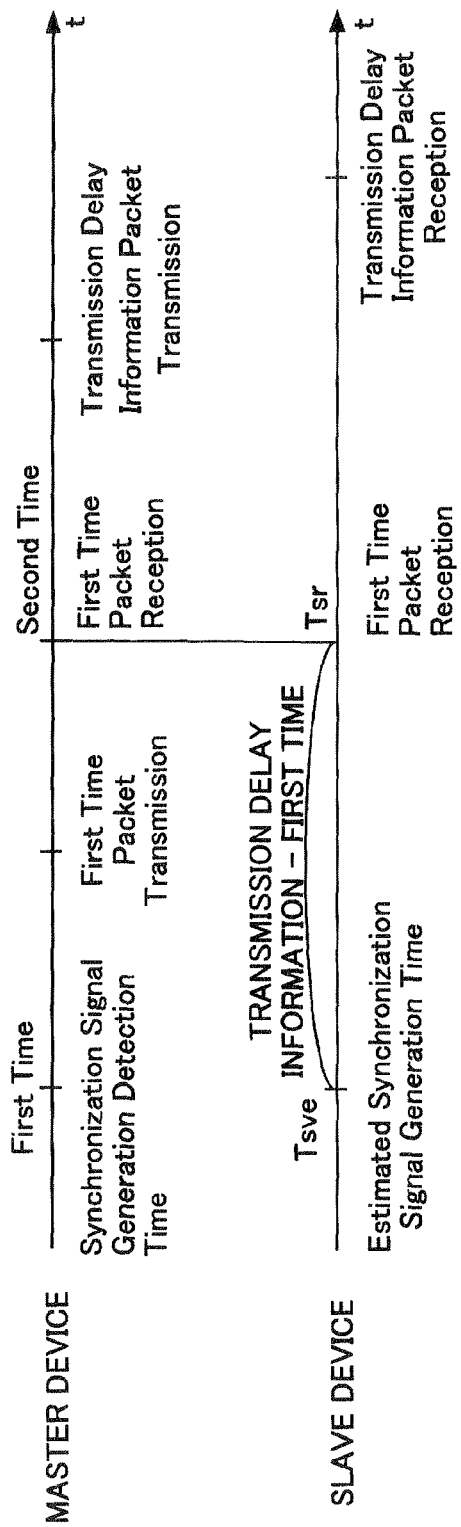
FIG. 7 is a diagram illustrating the processing shown in FIG. 6 in a chronological order.

FIG. 6 is a diagram illustrating a flow of processing executed by the master device 20A and the slave device 20B, and FIG. 7 is a diagram illustrating the processing executed by each of the master device 20A and the slave device 20B in a chronological order.

First, the processing executed by the master device 20A is described with reference to Steps A1 to A2 in FIG. 6 as well as the chronological order shown in FIG. 7.

At first, when the synchronization signal detecting unit 24A detects the generation of the synchronization signal, the control unit 22A of the master device 20A obtains a time at which the synchronization signal is generated from the timer unit 25A constituted by an internal clock, and transmits the synchronization signal generation time packet by multicasting at the timing at which the synchronization signal is detected (Step A1). The synchronization signal generation time packet corresponds to the first time data according to the present invention. The control unit 22A obtains the time at which the synchronization signal is generated using an interrupt handler, or the processing, that obtains the time at which the synchronization signal is generated, is carried out with higher priority than other processing. As a result, it is possible to preferentially and immediately obtain the time at which the synchronization signal is generated, no matter what processing the master device 20A is carrying out. The synchronization signal generation time packet is a packet containing information of the time at which the synchronization signal is detected. This packet is transmitted to the master device 20A and all of the slave devices 20B at the same time, all devices of which are connected to the concentrator 27A.

Next, the master device 20A receives the packet that the master device 20A itself has transmitted. Then, the master device 20A transmits a transmission delay information packet containing time information indicating the transmission delay information to the slave device 20B at the timing at which the packet is received (Step A2). The transmission delay information packet corresponds to the second time data. At this time, the control unit 22A obtains the time at which the packet is received by an interrupt handler, or the processing that obtains the time at which the packet is received is carried out with higher priority than other processing. As a result, it is possible to preferentially and immediately obtain the time at which the packet is received, no matter what processing the master device 20A is carrying out. The time at which synchronization signal generation time data is received, for example, can be transmitted as the transmission delay information.

Next, the processing executed by the slave device 20B is described with reference to Steps B1 to B3 in FIG. 6 as well as to the chronological order shown in FIG. 7.

At first, upon reception of the synchronization signal generation time packet that the master device 20A has transmitted in Step A2, the control unit 22B of the slave device 20B obtains, at this timing, the time Tsr at which the packet is received from the timer unit 25B constituted by the internal clock, and records the time Tsr in the memory of the slave device 20B (not shown) (Step B1). Next, the control unit 22B receives the transmission delay information packet that the master device 20A has transmitted in Step A2 (Step B2). The control unit 22B obtains the time at which the packet is received by an interrupt handler, or the processing, that obtains the time at which the packet is received, is carried out with higher priority than other processing. As a result, it is possible to preferentially and immediately obtain the time at which the packet is received, no matter what processing the slave device 20B is carrying out.

Next, the estimated generation time Tsve at which the synchronization signal is estimated to be generated on the master device 20A is calculated (Step B3). The time Tsve is calculated based on the following expression.

$$Tsve = Tsr - \text{transmission delay value}$$

Here, when the transmission delay information contained in the transmission delay information packet that has been received in Step B2 is the time at which the master device 20A receives the synchronization signal generation time data, the transmission delay value is calculated by subtracting the time Tsr at which the packet is received from the time at which the master device 20A receives the synchronization signal generation time data.

Using the obtained estimated generation time Tsve at which the synchronization signal is generated on the master device 20A, control is carried out so that the difference with the time at which the synchronization signal on the slave device 20B is generated becomes zero. As a result, it is possible to synchronize the timings at which the synchronization signal is generated between a plurality of various network-connected home appliances as the master device 20A and the slave device 20B. As a result, it is possible to reproduce, on the slave device 20B, the time at which the synchronization signal is generated on the master device 20A.

From the foregoing description, according to the present invention, it is possible to control the synchronization between the master device and the slave devices connected via the network without any additional hardware, based on the operations processed between the master device and the slave devices.

In the present embodiment, an example is described in which the master device 20A and the slave devices 20B to 20N are connected using the concentrator 27A capable of carrying out multicast transmission in the communications network; however, the present invention is not limited thereto. As long as the multicast transmission between the devices 20A to 20N can be carried out, and as long as the transmission delay between the master device 20A and the concentrator 27A can be made equal to that between the hub 27a and the slave players, the communications network is not limited to a wired network, and can be a wireless network that is formed using a wireless LAN such as IEEE 802.11 or Bluetooth (registered trademark), for example. In this case, the concentrator 27A becomes a wireless LAN access point or a Bluetooth hub.

Furthermore, in the present embodiment, the master device 20A is described as transmitting the reception time at which the synchronization signal generation time packet is received as the transmission delay information. However, the present invention is not limited thereto. For example, if the transmission delay through the network route via which each of the slave devices 20B to 20N is connected with the master device 20A is known, the master device 20A can transmit information containing the transmission delay in addition to the reception time at which the synchronization signal generation time packet is received. Depending on conditions of the network route from the master device 20A to the concentrator 27A and the network route from the concentrator 27A to the slave devices 20B to 20N, the time at which the master device 20A receives the synchronization signal generation time packet via the concentrator 27A often differs to a large degree from that at which one of the slave devices 20B to 20N receives the synchronization signal generation time packet via the concentrator 27A. If a difference between the time required for the master device 20A to receive the packet via the concentrator 27A and the time required for each of the slave devices 20B to 20N to receive the packet via the concentrator 27A is known, each of the slave devices 20B to 20N can calculate the transmission delay value by considering the time at which the master device 20A received the synchronization signal generation time data via the concentrator 27A along with the difference between the time at which the master device 20A has received the synchronization signal generation time data via the concentrator 27A and the time at which any of the slave devices 20B to 20N receives the synchronization signal generation time data via the concentrator 27A.

While synchronous control systems according to various embodiments have been described, the master device and slave devices constituting the synchronous control system according to the present invention can be implemented by a master device program and a slave device program which make a computer including a CPU and a memory serve as the above-mentioned means. The master device program and the slave device program can be distributed through a communication line, and can also be written in a recording medium such as CD-ROM and distributed.

Preferred embodiments of the present invention have been described above, but the present invention is not limited to specific embodiments. Moreover, the effects described for the embodiments according to the present invention are merely a recitation of the most preferable effects produced by the present invention, and effects resulting from the present invention are not be limited to those described for the embodiments.

The invention claimed is:

1. A method of synchronous control for a synchronous control system provided with a master device and at least one slave device connected via a communications network, the method comprising steps of:
the master device transmitting first time data to the master device and the at least one slave device via a hub upon detection of generation of a synchronization signal, the first time data indicating a time at which the synchronization signal is generated;
the master device transmitting second time data to the at least one slave device upon reception of the first time data via the hub, the second time data indicating a time at which the first time data is received by the master device;
each of the at least one slave device calculating, upon reception of the first time data and the second time data, an estimated generation time at which the synchronization signal is estimated to be generated by subtracting a time elapsed between the time indicated by the first time data and the time indicated by the second time data from time at which the first time data was received; and
each of the at least one slave device controlling synchronization with the master device based on the estimated generation time.

2. The method of synchronous control according to claim 1, wherein the first time data is received from the hub by the master device and each of the at least one slave device substantially at the same time.

3. The method of synchronous control according to claim 1, wherein a difference between the time at which the master device receives the first time data and the time at which the at least one slave device receives the first time data is known and constant, and wherein the step of calculating the estimated generation time of the synchronization signal includes calculating the estimated generation time by taking the difference into account.

4. A synchronous control system, comprising:
a master device including a transmitter receiver unit that transmits and receives data via a communications network, a synchronous signal detecting unit that detects generation of a synchronous signal, a timer unit that keeps time, and a control unit; and
at least one slave device including a receiver unit that receives data from the master device via the communications network, a timer unit that keeps time, and a control unit, the communications network including a hub that connects the master device and the at least one slave device, wherein:
when the synchronous signal detecting unit detects generation of a synchronization signal, the control unit of the master device obtains a time at which the synchronization signal is generated from the timer unit of the master device, transmits first time data indicating a time at which the synchronization signal is generated to the master device and the at least one slave device via the hub by way of the transmitter receiver unit, and when the transmitter receiver unit receives the first time data via the communications network, further obtains a time at which the first time data is received from the timer unit of the master device, and transmits second time data to the at least one slave device, the second time data indicating a time at which the first time data is received; and
when the receiver unit of each of the at least one slave device receives the first time data and the second time data from the master device via the hub, the control unit of each of the at least one slave device calculates an estimated generation time at which the synchronization signal is estimated to be generated by subtracting a time elapsed between the time indicated by the first time data and the time indicated by the second time data from the time at which the first time data was received, and controls synchronization with the master device based on the estimated generation time.

5. The synchronous control system according to claim 4, wherein the first time data is received from the hub by the master device and each of the at least one slave device substantially at the same time.

6. The synchronous control system according to claim 4, wherein:
a difference between the time at which the master device receives the first time data and the time at which the at least one slave device receives the first time data is known and constant;
and wherein the control unit of the at least one slave device calculates the estimated generation time by taking the difference into account.

7. A method of synchronous control for a synchronous control system provided with a master device and at least one slave device connected via a communications network, the method comprising steps of:
transmitting first time data from a master device to the master device and the at least one slave device via a hub upon detection of generation of a synchronization signal, the first time data indicating a time at which the synchronization signal is generated;
transmitting second time data from the master device to the at least one slave device upon reception of the first time data via the hub, the second time data indicating a time at which the first time data is received by the master device, wherein the first time data and the second time data are configured such that each of the at least one slave device can calculate, upon reception of the first time data and the second time data, an estimated generation time at which the synchronization signal is estimated to be generated by subtracting a time elapsed between the time indicated by the first time data and the time indicated by the second time data from time at which the first time data was received.

* * * * *